Dec. 3, 1963

R. ESSAM 3,113,269

RADIO DUPLEXING APPARATUS FOR USE IN A CONTINUOUS WAVE RADIO SYSTEM

Filed Dec. 19, 1961

2 Sheets-Sheet 1

INVENTOR
ROY ESSAM
BY
Kirschstein, Kirschstein & Ottinger
ATTORNEYS

INVENTOR
ROY ESSAM
BY
Kurt Kelman, Kurt Kelman + Ottinger [signature]
ATTORNEYS 3,113,269

RADIO DUPLEXING APPARATUS FOR USE IN A CONTINUOUS WAVE RADIO SYSTEM

Roy Essam, Stanmore, England, assignor to The General Electric Company Limited, London, England Filed Dec. 19, 1961, Ser. No. 160,590
Claims priority, application Great Britain Dec. 22, 1960
9 Claims. (Cl. 325—24)

This invention relates to radio apparatus for use in a continuous wave radio system.

More particularly, but not exclusively, the invention is concerned with radio duplexing apparatus for use in a continuous wave radio system, that is to say, apparatus which enables an aerial system to be coupled to both a transmitter and a receiver but at the same time prevents excessive energy supplied by the transmitter being fed directly to the receiver. The radio system to which the invention is applied may, for example, be a continuous wave radar system.

According to the present invention, radio apparatus for use in a continuous wave radio system comprises a radio transmitter, a radio receiver, an aerial arrangement, a first path over which during operation is supplied a radio frequency signal from the transmitter to the aerial arrangement, a second path over which during operation is supplied a radio frequency signal from the aerial arrangement to the receiver, means to derive a signal from the first path and to supply to the second path, and control means automatically to control the amplitude and phase of the derived signal so that the amplitude of the undesired signal on the second path due to undesired coupling between the first and second paths is reduced.

According to a first feature of the present invention, radio apparatus for use in a continuous wave radio system comprises a radio transmitter, a radio receiver, an aerial, a first path over which during operation is supplied a radio frequency signal from the transmitter, a second path which constitutes a feeder for the aerial, a third path over which during operation is supplied a radio frequency signal to the receiver, a circulator which is connected to the first, second and third paths and which is arranged to pass signals supplied thereto over the first and second paths mainly to the second and third paths respectively, means to derive a signal from the first path and supply it to the third path, and control means automatically to control the amplitude of the derived signal to be similar to the amplitude of the portion of the signal supplied to the circulator over the first path which breaks through to the third path and to control the phase of said derived signal to be substantially opposite to the phase of said portion of the signal supplied to the circulator over the first path which breaks through to the third path, so that the amplitude of the breakthrough signal on the third path is reduced.

Preferably said control means includes a first waveguide which provides an input at one end and is terminated at the other end, a second waveguide which provides an output at one end and is terminated at the other end, a coupling between the first and second waveguides such that an input signal supplied to said input gives rise to an output signal supplied to said output, means to vary the effective distances between the coupling and the terminations of the first and second waveguides respectively in opposite senses and by similar amounts for the purpose of varying the amplitude of the output signal, and means to vary the effective distances between the coupling and the terminations of the first and second waveguides respectively in the same sense and by similar amounts for the purpose of varying the phase of the output signal relative to the phase of the input signal.

A known construction of circulator to provide coupling between the three paths in the manner set out in the last paragraph but one is sometimes referred to as a three-arm or three-port circulator, and may be derived from the more commonly known four-arm circulator in the manner described in an article entitled "Ferrite Components in Microwave Systems" commencing on page 341 of "Electronic Engineering," May 1958, with particular reference to page 342. A three-arm circulator is also described in an article entitled "Waveguide Components with Non-Reciprocal Properties" which commences on page 376 of "Electronic Engineering," September 1956, with particular reference to page 379.

The circulator may be of the kind depending for its operation on the Faraday rotation effect, but apparatus in accordance with the first feature of the present invention does not necessarily comprise this kind of circulator, and it may equally well comprise any circulator which provides non-reciprocal coupling between the three paths in the manner stated.

In practice it is found that there is always some "breakthrough" coupling between the paths between which the circulator is required not to provide coupling. Such breakthrough coupling is due partly to the circulator not being ideal and partly to the effect of the non-reciprocal properties of the circulator on the portion of any signal passed by the circulator which is reflected back to the circulator. In order to appreciate the latter effect, it is convenient to consider apparatus in accordance with the first feature of the present invention if the said means and said control means were not to be provided; assuming also that the second path is not correctly terminated, a portion of any signal fed from the first path to the second path by the circulator would be reflected back from the termination to the circulator and would therefore be passed to the third path so that there would effectively be some "breakthrough" coupling between the first and third paths.

Clearly breakthrough coupling is most undesirable in duplexing apparatus as it would cause excessive energy to be supplied directly from the transmitter to the receiver. Equally, however, some unwanted coupling may occur when two separate aerials are used and there is no circulator. In this case signals from the transmitter are radiated by one aerial and signals picked up by the other aerial are supplied to the receiver. If the aerials are sufficiently directional undesirable direct coupling between the aerials may be reduced, but it cannot be eliminated, so that in all cases some part of the signal radiated by one aerial will pass directly by way of the other aerial to the receiver.

According to a second feature of the present invention, therefore, radio apparatus for use in a continuous wave radio system comprises a radio transmitter, a radio receiver, first and second aerials, a first path over which during operation is supplied a radio frequency signal from the transmitter to the first aerial, a second path over which during operation is supplied a radio frequency signal from the second aerial to the receiver, means to derive a signal from the first path and supply it to the second path, and control means automatically to control the amplitude and the phase of the derived signal so that the amplitude of the undesired signal on the second path due to the portion of the signal which passes directly from the first to the second aerial is reduced.

Preferably said control means controls the amplitude of said derived signal to be similar to the amplitude of said undesired signal and the phase of said derived signal to be substantially opposite to the phase of said undesired signal.

Preferably said control means includes a first waveguide which provides an input at one end and is terminated at the other end, a second waveguide which provides an output at one end and is terminated at the other end, a coupling between the first and second waveguides such that an input signal supplied to said input gives rise to an output signal supplied to said output, means to vary the effective distances between the coupling and the terminations of the first and second waveguides respectively in opposite senses and by similar amounts for the purpose of varying the amplitude of the output signal, and means to vary the effective distances between the coupling and the terminations of the first and second waveguides respectively in the same sense and by similar amounts for the purpose of varying the phase of the output signal relative to the phase of the input signal.

Radio apparatus in accordance with the present invention will now be described by way of example with reference to the accompanying drawings, in which.

Figure 1:
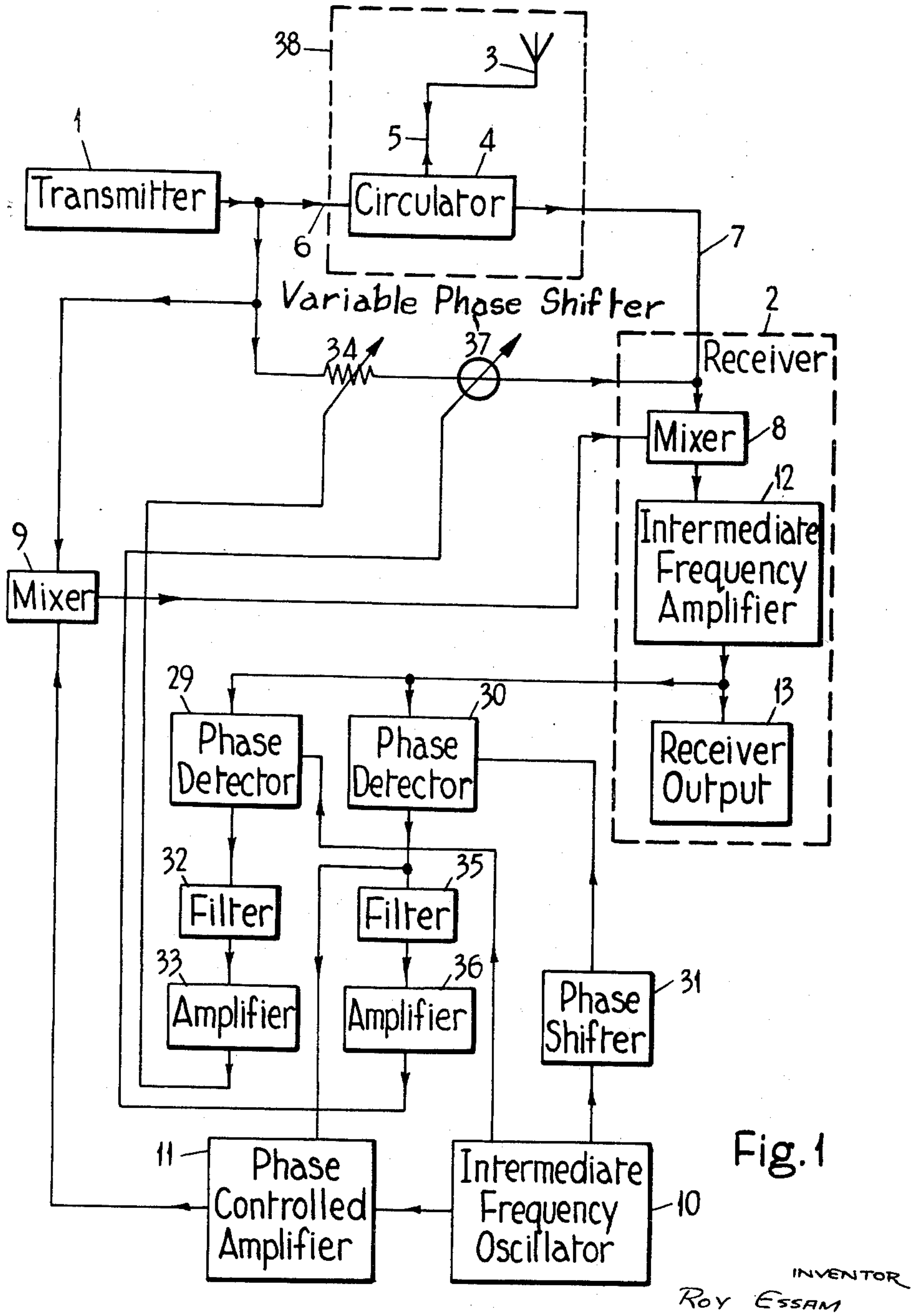
FIGURE 1 shows the apparatus in block schematic form.

Referring now to FIGURE 1 of the drawings, the apparatus to be described forms part of a continuous wave radar system which is arranged to operate at a frequency of the order of 10,000 megacycles per second, the system comprising a radar transmitter 1 and a radar receiver 2, which are arranged to be coupled to an aerial 3 by way of a circulator 4 and an aerial feeder 5. The circulator 4 is arranged, at least theoretically, to pass to the aerial feeder 5 any signal which is supplied to the circulator 4 by the transmitter 1, whilst any signal supplied to the circulator 4 over the aerial feeder 5 is passed to the receiver 2.

The circulator 4 comprises a waveguide of circular cross-section at the ends of which are first and second transitional sections, respectively, for converting from the waveguide of circular cross-section to a waveguide of rectangular cross-section, whilst adjacent the second transitional section there is a third transitional section which has a stepped twist. The waveguide with its first, second and third transitional sections is connected between a waveguide 6 of rectangular cross-section over which a signal from the transmitter 1 is supplied and a further waveguide of rectangular cross-section which forms the aerial feeder 5.

Within the circular waveguide which forms part of the circulator 4 is provided a tube of magnesium manganese ferrite, which is so dimensioned that it is in contact with the wall of the waveguide thereby assisting cooling of the ferrite tube during operation of the apparatus. The portion of the circular waveguide in which the ferrite tube lies is embraced by an annular permanent magnet which provides a magnetic field extending longitudinally within the circular waveguide in the region of the ferrite tube. A still further waveguide 7 of rectangular cross-section opens into the circular waveguide at a point between the ferrite tube and the first transitional portion of the circular waveguide, the longitudinal axis of the waveguide 7 being at right angles to that of the circular waveguide.

The circulator 4 is arranged in known manner so that the ferrite tube causes any signal being passed in either direction along the circular waveguide to be subjected to a Faraday rotation of 45° and the arrangement is such that any signal supplied to the circulator 4 from the transmitter 1 over the waveguide 6 is passed mainly to the aerial feeder 5, with only a small portion thereof reaching the waveguide 7 to which the receiver 2 is connected. Similarly, any signal supplied to the circulator 4 from the aerial feeder 5 is passed mainly to the waveguide and hence to the receiver 2.

For the purpose of matching the waveguide 7 to the circular waveguide forming part of the circulator 4, the waveguide 7 is provided with an iris. In addition, the circular waveguide contains a septum plate which is situated opposite the end of the waveguide 7 and which presents a short circuit across the circular waveguide as far as signals passing into the circulator 4 from the aerial feeder 5 are concerned, but permits the passage of signals supplied to the circular waveguide by the waveguide 6, due to the different planes of polarisation of these signals.

A fuller description of a suitable circulator may be found by reference to the specification and drawings of copending United States patent application Serial No. 12,496, filed March 1, 1960 for Non-Reciprocal Coupling Arrangements for Radio Frequency Signals.

The receiver 2 also comprises a mixer 8 which is arranged to derive the intermediate frequency of the receiver 2 by heterodyning locally generated oscillations with the signal supplied to the receiver 2 by the circulator 4. A mixer 9 is arranged to supply the locally generated oscillations by heterodyning together a portion of the signal supplied by the transmitter 1 to the circulator 4 and a signal supplied by a crystal controlled, intermediate frequency local oscillator 10, the output of which is supplied to the mixer 9 by way of a phase controlled amplifier 11.

The intermediate frequency signal supplied by the mixer 8 is passed through an intermediate frequency amplifier 12, one output of which is connected to the remaining stages 13 of the receiver 2, which are of known form and are not therefore described in detail.

As so far described, the apparatus would operate in such a way that appreciable energy would be supplied directly to the receiver 2 from the transmitter 1 as a result of break-through coupling associated with the circulator 4. In order to reduce the effect of this breakthrough signal, a portion of the signal supplied by the transmitter 1 to the circulator 4 is supplied to the waveguide 7, the amplitude and phase of this portion being automatically controlled, in a manner to be described hereafter, so as to tend to cancel the breakthrough signal.

Figure 2:
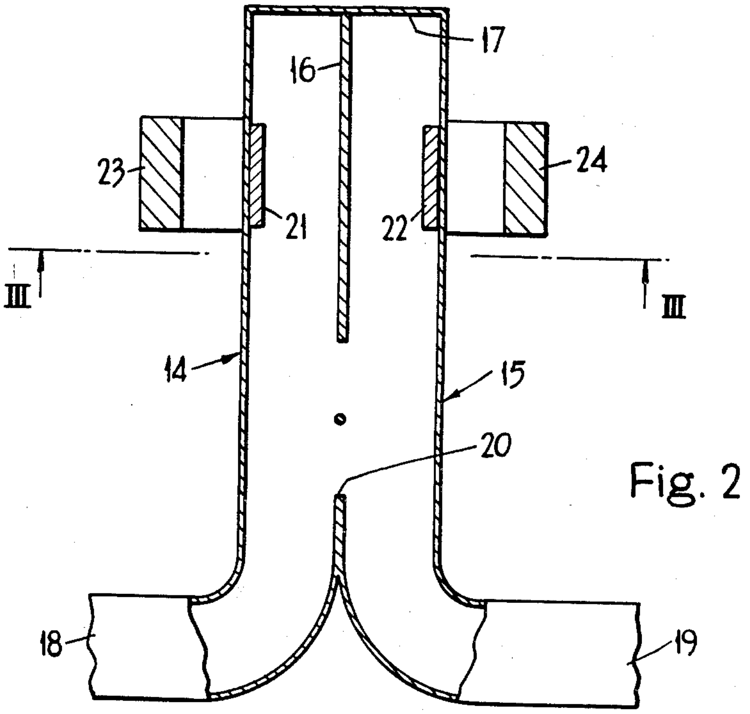
FIGURE 2 shows a cross-section of a part of the apparatus of FIGURE 1.
Figure 3:
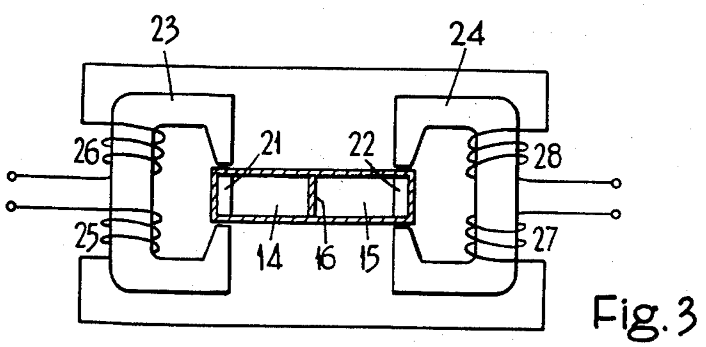
FIGURE 3 shows a section on the line III—III of FIGURE 2.

Referring now to FIGURES 2 and 3 of the drawings, the arrangement for bringing about this variation in the amplitude and phase of the signal supplied to the mixer 8 comprises a pair of waveguides 14 and 15 of rectangular cross-section which have a narrow wall 16 in common and which are terminated at one end 17. The open end of waveguide 14 remote from the termination 17 forms the input 18 to the arrangement and is coupled to the waveguide 6 (FIGURE 1), whilst the open end of the other waveguide 15 remote from the termination 17 forms the output 19 from the arrangement and is coupled to the waveguide 7 (FIGURE 1).

A coupling slot 20 is provided in the common wall 16 between the waveguides 14 and 15, and in each of the waveguides 14 and 15 is provided a ferrite slab 21 and 22 respectively between the coupling slot 20 and the termination 17. Each of these ferrite slabs 21 and 22 has one dimension the same as the smaller internal dimension of the waveguides 14 and 15 and the ferrite slabs 21 and 22 are situated so as to be in contact with the two narrow faces respectively of the waveguides 14 and 15 opposite the common wall 16.

Each of the ferrite slabs 21 and 22 has associated with it an electro-magnetic arrangement comprising a ferromagnetic core 23 or 24 respectively, having two windings 25 and 26, or 27 and 28 respectively thereon, and having a space between its pole pieces which is substantially filled by the ferrite slab 21 or 22 respectively. Each of the windings 25 and 26 is connected in series with the corresponding winding 27 or 28 respectively, although in the case of the windings 26 and 28 the connections are reversed, so that the windings 25 and 26 are wound in opposite senses on the core 23.

The operation of the arrangement is then as follows. When a signal is supplied to the input 18 an output signal is supplied from the output 19, the amplitude and phase of this output signal being dependent upon the signals then being supplied to the windings 25 and 27, and 26 and 28. Considering first the windings 25 and 27, when a direct current signal is supplied to the windings 25 and 27, a similar steady magnetic field is set up in each of the waveguides 14 and 15, the effect of these magnetic fields being to change the effective distance between the coupling slot 20 and the termination 17 for each of the waveguides 14 and 15 in the same sense and by similar amounts, so that the phase of the output signal relative to the input signal is varied.

Considering now the windings 26 and 28, when a direct current signal is supplied to the windings 26 and 28, a steady magnetic field is set up in each of the waveguides 14 and 15, but the magnetic fields are of opposite senses in the waveguides 14 and 15. Thus the effective distance between the coupling slot 20 and the termination 17 in the waveguides 14 and 15 is varied, but in opposite senses for the two waveguides 14 and 15. This, therefore, has the effect of varying the amplitude of the output signal.

It will, therefore, be seen that by supplying to the windings 25 and 27 and 26 and 28, direct current signals of the required amplitudes the arrangement can be made to produce an output signal having the desired amplitude and phase. The arrangements for providing these two direct current signals will now be described with reference to FIGURE 1.

In addition to being supplied to the output stage 13 of the receiver 2, the output of the intermediate frequency amplifier 12 is supplied to phase detectors 29 and 30. The phase detector 29 is also supplied with a signal derived from the intermediate frequency oscillator 10, and the phase detector 29 operates to supply an output direct current in dependence upon the phase relationship between the signal supplied thereto by the intermediate frequency amplifier 12 and the signal supplied thereto by the intermediate frequency oscillator 10.

The phase detector 30 is also supplied with a signal derived from the intermediate frequency oscillator 10, although in this case the signal is phase shifted by 90° in a phase shifter 31 prior to being supplied to the phase detector 30. The phase detector supplies an output direct current in dependence upon the phase relationship between the signal supplied thereto by the intermediate frequency amplifier 12 and the signal supplied thereto by the intermediate frequency oscillator 10.

The output of the phase detector 29 after being passed through a low-pass filter 32 and an amplifier 33, forms the direct current signal which is supplied to the arrangement previously described the relevant part of which is represented by the variable resistor 34, for the purpose of bringing about the required variation in amplitude in the signal supplied to the waveguide 7.

The output of the phase detector 30 after being passed through a low-pass filter 35 and an amplifier 36, forms the direct current signal which is supplied to the arrangement previously described the relevant part of which is represented by the variable phase shifter 37, for the purpose of bringing about the required variation in phase in the signal supplied to the waveguide 7.

In addition, the output of the phase detector 30 is supplied to the phase controlled amplifier 11 for the purpose of controlling the phase of the signal supplied by the intermediate frequency oscillator 10 to the mixer 9, this being necessary to ensure that the signal supplied by the mixer 9 to the mixer 8 is correctly phased relative to the signal supplied by the transmitter 1.

During operation of the radar system of which the apparatus forms part, scanning is brought about by movement of the aerial 3. The impedance presented by the aerial 3, naturally varies somewhat during scanning, with the result that a variable portion of the signal supplied by the transmitter 1 to the aerial feeder 5 is reflected back to the circulator 4.

It will be appreciated that the arrangement described above serves automatically to compensate for this reflection, in addition to compensating for coupling between the waveguides 6 and 7 arising in the circulator 4, so as to ensure that the amplitude of the breakthrough signal supplied to the receiver 2 is always small.

During operation of the radar system, radio waves radiated by the aerial 3 are reflected back by any moving object with a slight change of frequency, due to radio Doppler effect, and such a frequency shift is then detected in known manner by the remaining stages 13 of the receiver 2.

Figure 4:
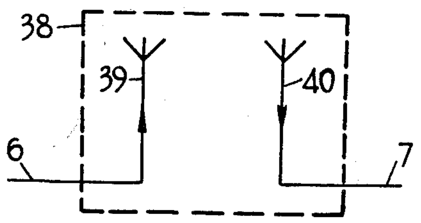
FIGURE 4 shows a modification to a part of the apparatus of FIGURE 1.

It will be appreciated that the apparatus described above may be modified by the omission of the circulator 4. This modification is shown in FIGURE 4 of the drawings, the modification being made by substituting the arrangement within the broken rectangle 38 of FIGURE 4 for that within the broken rectangle 38 of FIGURE 1.

In this case two aerials, 39 and 40 are required, the transmitter 1 supplying an outgoing signal over the waveguide 6 to the aerial 39, whilst the aerial 40 supplies an incoming signal over the waveguide 7 to the receiver 2. The aerials 39 and 40 are both directional and so arranged that there is little direct coupling between them. Such coupling does nevertheless occur to some extent, with the result that an undesired signal appears in the waveguide 7 due to a portion of the outgoing signal which passes directly from the aerial 39 to the aerial 40. This undesired signal may, however, be substantially reduced by supplying a portion of the signal from waveguide 6 to the waveguide 7 by way of an arrangement as described above which controls its amplitude and phase in such a way as to tend to cancel the undesired signal in the waveguide 7.

I claim:

1. Radio apparatus for use in a continuous wave radio system comprising a radio transmitter, a radio receiver, an aerial arrangement, a first path over which during operation is supplied a radio frequency signal from the transmitter to the aerial arrangement, a second path over which during operation is supplied a radio frequency signal from the aerial arrangement to the receiver, means to derive a signal from the first path and to supply it to the second path, a first waveguide which provides an input at one end for said derived signal and is terminated at the other end, a second waveguide which provides an output at one end for said derived signal and is terminated at the other end, a coupling between the first and second waveguides, means to vary the effective distances between the coupling and the terminations of the first and second waveguides respectively in opposite senses and by similar amounts for the purpose of varying the amplitude of the derived signal, and means to vary the effective distances between the coupling and the terminations of the first and second waveguides respectively in the same sense and by similar amounts for the purpose of varying the phase of the derived signal, whereby automatically to reduce the amplitude of the undesired signal on the second path due to undesired coupling between the first and second paths.

2. Radio apparatus for use in a continuous wave radio system comprising a radio transmitter, a radio receiver, an aerial arrangement, a first path over which during operation is supplied a radio frequency signal from the transmitter to the aerial arrangement, a second path over which during operation is supplied a radio frequency signal from the aerial arrangement to the receiver, means to derive a signal from the first path and to supply it to the second path, a first waveguide which provides an input at one end for said derived signal and is terminated at the other end, a second waveguide which provides an output at one end for said derived signal and is terminated at the other end, a coupling between the first and second waveguides, a first ferrite member situated in the first waveguide between the coupling and the termination of the first waveguide, a second ferrite member situated in the second waveguide between the coupling and the termination of the second waveguide, means providing two steady magnetic fields of similar value but opposite senses in which the first and second ferrite members respectively lie, whereby to vary the effective distances between the coupling and the terminations of the first and second waveguides respectively in opposite senses and by similar amounts for the purpose of varying the amplitude of the derived signal, and means providing two steady magnetic fields of similar value and sense in which the two ferrite members respectively, lie, whereby to vary the effective distances between the coupling and the terminations of the first and second waveguides respectively in the same sense and by similar amounts for the purpose of varying the phase of the derived signal, whereby automatically to reduce the amplitude of the undesired signal on the second path due to undesired coupling between the first and second paths.

3. Radio apparatus for use in a continuous wave radio system comprising a radio transmitter, a radio receiver, an aerial, a first path over which during operation is supplied a radio frequency signal from the transmitter, a second path over which during operation is supplied a radio frequency signal to the receiver, a third path which constitutes a feeder for the aerial, a circulator which is connected to the first, second and third paths and which is arranged to pass signals supplied thereto over the first and third paths mainly to the third and second paths respectively, means to derive a signal from the first path and supply it to the second path, a first waveguide which provides an input at one end for said derived signal and is terminated at the other end, a second waveguide which provides an output at one end for said derived signal and is terminated at the other end, a coupling between the first and second waveguides, a first ferrite member situated in the first waveguide between the coupling and the termination of the first waveguide, a second ferrite member situated in the second waveguide between the coupling and the termination of the second waveguide, means providing two steady magnetic fields of similar value but opposite senses in which the first and second ferrite members respectively lie, whereby to vary the effective distances between the coupling and the terminations of the first and second waveguides respectively in opposite senses and by similar amounts and so automatically control the amplitude of the derived signal to be similar to the amplitude of the portion of the signal supplied to the circulator over the first path which breaks through to the second path, and means providing two steady magnetic fields of similar value and sense in which the two ferrite members respectively lie, whereby to vary the effective distances between the coupling and the terminations of the first and second waveguides respectively in the same sense and by similar amounts so as automatically to control the phase of the derived signal to be substantially opposite to the phase of the portion of the signal supplied to the circulator over the first path which breaks through to the second path, so that the amplitude of the breakthrough signal on the second path is reduced.

4. Radio apparatus for use in a continuous wave radio system comprising a radio transmitter, a radio receiver, first and second aerials, a first path over which during operation is supplied a radio frequency signal from the transmitter to the first aerial, a second path over which during operation is supplied a radio frequency signal from the second aerial to the receiver, means to derive a signal from the first path and supply it to the second path, a first waveguide which provides an input at one end for said derived signal and is terminated at the other end, a second waveguide which provides an output at one end for said derived signal and is terminated at the other end, a coupling between the first and second waveguides, a first ferrite member situated in the first waveguide between the coupling and the termination of the first waveguide, a second ferrite member situated in the second waveguide between the coupling and the termination of the second waveguide, means providing two steady magnetic fields of similar value but opposite senses in which the first and second ferrite members respectively lie, whereby to vary the effective distances between the coupling and the terminations of the first and second waveguides respectively in opposite senses and by similar amounts and so automatically control the amplitude of the derived signal to be similar to the amplitude of the portion of the signal supplied to the circulator over the first path which breaks through to the second path, and means providing two steady magnetic fields of similar value and sense in which the two ferrite members respectively lie, whereby to vary the effective distances between the coupling and the terminations of the first and second waveguides respectively in the same sense and by similar amounts so as automatically to control the phase of the derived signal to be substantially opposite to the phase of the portion of the signal supplied to the circulator over the first path which breaks through to the second path, so that the amplitude of the breakthrough signal on the second path is reduced.

5. Radio apparatus for use in a continuous wave radio system comprising a radio transmitter, a radio receiver, an aerial arrangement, a first path over which during operation is supplied a radio frequency signal from the transmitter to the aerial arrangement, a second path over which during operation is supplied a radio frequency signal from the aerial arrangement to the receiver, means to derive a signal from the first path and to supply it to the second path, a first waveguide which provides an input at one end for said derived signal and is terminated at the other end, a second waveguide which provides an output at one end for said derived signal and is terminated at the other end, a coupling between the first and second waveguides, a first ferrite member situated in the first waveguide between the coupling and the termination of the first waveguide, a second ferrite member situated in the second waveguide between the coupling and the termination of the second waveguide, means providing two steady magnetic fields of similar value but opposite senses in which the first and second ferrite members respectively lie, whereby to vary the effective distances between the coupling and the terminations of the first and second waveguides respectively in opposite senses and by similar amounts for the purpose of varying the amplitude of the derived signal, means providing two steady magnetic fields of similar value and sense in which the two ferrite members respectively lie, whereby to vary the effective distances between the coupling and the terminations of the first and second waveguides respectively in the same sense and by similar amounts for the purpose of varying the phase of the derived signal, and means controlling the value of said fields in dependence upon the phase of said radio frequency signal supplied over said second path, whereby automatically to reduce the amplitude of the undesired signal on the second path due to undesired coupling between the first and second paths.

6. An amplitude and phase control device for radio apparatus comprising a first waveguide which provides an input at one end and is terminated at the other end, a second waveguide which provides an output at one end and is terminated at the other end, a coupling between the first and second waveguides such that an input signal supplied to said input gives rise to an output signal supplied to said output, means to vary the effective distances between the coupling and the terminations of the first and second waveguides respectively in opposite senses and by similar amounts for the purpose of varying the amplitude of the output signal, and means to vary the effective distances between the coupling and the terminations of the first and second waveguides respectively in the same sense and by similar amounts for the purpose of varying the phase of the output signal.

7. An amplitude and phase control device as claimed in claim 6, wherein the first and second waveguides each have a ferrite member situated in the waveguide between the coupling and the relevant termination, wherein the means to vary the effective distances between the coupling and the terminations in opposite senses by similar amounts comprises means to provide two steady magnetic fields of similar value but opposite senses in which the two ferrite members respectively lie, wherein the means to vary the effective distances between the coupling and the terminations in the same sense by similar amounts comprises means to provide two steady magnetic fields of similar value and sense in which the two ferrite members respectively lie.

8. Radio apparatus for use in a continuous wave radio system comprising a radio transmitter, a radio receiver, an aerial arrangement, a first path over which during operation is supplied a radio frequency signal from the transmitter to the aerial arrangement, a second path over which during operation is supplied a radio frequency signal from the aerial arrangement to the receiver, means to derive a signal from the first path and to supply it to the second path, a first waveguide which provides an input at one end for said derived signal and is terminated at the other end, a second waveguide which provides an output at one end for said derived signal and is terminated at the other end, a coupling between the first and second waveguides, first phase shift means located between said coupling and the terminated end of said first waveguide, second phase shift means located between said coupling and the terminated end of said second waveguide, means to vary the first and second phase shift means in opposite senses and by similar amounts for the purpose of varying the amplitude of the derived signal, and means to vary the first and second phase shift means in the same sense and by similar amounts for the purpose of varrying the phase of the derived signal, whereby automatically to reduce the amplitude of the undesired signal on the second path due to undesired coupling between the first and second paths.

9. Radio apparatus for use in a continuous wave radio system comprising a radio transmitter, a radio receiver, an aerial arrangement, a first path over which during operation is supplied a radio frequency signal from the transmitter to the aerial arrangement, a second path over which during operation is supplied a radio frequency signal from the aerial arrangement to the receiver, means to derive a signal from the first path and to supply it to the second path, a first waveguide which provides an input at one end for said derived signal and has a short-circuited termination at the other end, a second waveguide which provides an output at one end for said derived signal and has a short-circuited termination at the other end, a coupling between the first and second waveguides, first phase shift means located between said coupling and the terminated end of said first waveguide, second phase shift means located between said coupling and the terminated end of said second waveguide, means to vary the first and second phase shift means in opposite senses and by similar amounts for the purpose of varying the amplitude of the derived signal, and means to vary the first and second phase shift means in the same sense and by similar amounts for the purpose of varying the phase of the derived signal, whereby automatically to reduce the amplitude of the undesired signal on the second path due to undesired coupling between the first and second paths.

References Cited in the file of this patent

UNITED STATES PATENTS

| | | |
|---|---|---|
| 2,760,057 | Johannesen | Aug. 21, 1956 |
| 3,011,134 | Reingold | Nov. 28, 1961 |
| 3,021,521 | Hutchins | Feb. 13, 1962 |